Patented July 15, 1952

2,603,639

UNITED STATES PATENT OFFICE 2,603,639

SULFONAMIDO COMPOUNDS

Wilhelm Friedrichsen, Ludwigshafen-on-the-Rhein, Germany

No Drawing. Application June 13, 1950, Serial No. 167,928. In Germany December 3, 1948

8 Claims. (Cl. 260—239.6)

This invention relates to sulfonamido compounds and methods of their preparation. More particularly it is concerned with sulfonamides of cyclic acetals derived from aliphatic glycols and low molecular aliphatic aldehydes.

The new compounds of the present invention may be represented by the following formula:

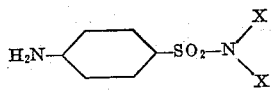

wherein at least one of the X shown stands for the radicle of a cyclic acetal derived, on the one hand, from an aliphatic saturated glycol in which the hydroxy groups are separated by from 2 to 3 carbon atoms, and, on the other hand, from an aliphatic aldehyde containing up to 2 carbon atoms, and wherein the sulfonamido group shown is attached to a carbon atom of the cyclic acetal which is separated from the oxygen atoms in the acetal ring by at least one carbon atom.

I may also define the new compounds according to my present invention as amino benzene sulfonic acid derivatives of amino-substituted 1.3-dioxanes or dioxalanes. The 1.3-dioxanes and dioxalanes according to my invention may contain in addition to the amino benzene sulfonamido group low aliphatic hydrocarbon radicles as substituents in the dioxane or dioxalane nucleus, such as one or more methyl or ethyl groups.

The amino compounds which are to be converted into the amino benzene sulfonic acid amides according to my invention may be prepared by various methods. I may prepare the 1.3-dioxanes by causing formaldehyde or acetaldehyde to act on olefines, such as ethylene, propene, n- and iso-butene, n- and iso-pentene, the various hexenes and heptenes, in the presence of water and a strong mineral acid or a strongly acid reacting metal salt, such as zinc chloride, thus obtaining 1.3-dioxanes which may be substituted by alkyl groups. These dioxanes then are halogenated to produce a monohalogeno compound. I prefer to carry out the halogenation with free halogen in the dark in order to avoid the entering of the halogen in α-position with reference to the oxygen atoms in the dioxane nucleus. When starting from a 1.3-dioxane which is not substituted in the 5-position, halogenation will take place there leading to a monohalogeno compound wherein the halogen is in β-position with reference to the oxygen atoms. When starting from a 1.3-dioxane substituted by methyl groups in either 2-, 4- or 6-position or in several of these positions, ω-halogenomethyl derivatives may be formed wherein the halogen atom is likewise in a β-position with reference to the oxygen atoms. I may also prepare 2-γ-halogenomethyl-1.3-dioxanes by reacetalization of 1.3-dioxanes unsubstituted in 2-position by lower aliphatic hydrocarbon radicals with β-halogenacetaldehyde, e. g. according to the following equation:

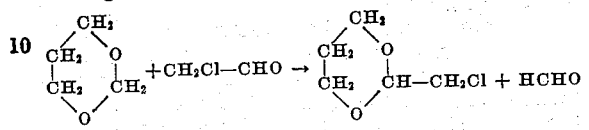

To prepare the amino-1.3-dioxanes, I treat the halogeno-1.3-dioxanes with ammonia preferably in excess and under increased pressure, thereby converting the halogen atoms into the amino group. Generally speaking, this reaction will give primary amines of the general formula X—NH₂, wherein X stands for a 1.3-dioxane radicle. Sometimes I may also obtain secondary amines of the general formula

and I may also use these amines as starting materials for the sulfonamides according to my invention.

On the other hand, I may come directly to the halogenated 1.3-dioxanes by carrying out the reaction between an olefine and formaldehyde in strongly acid aqueous solution, while using as starting material halogeno olefines, wherein the halogen atom is in α-position to one of the carbon atoms bearing the double linkage, such as iso-butenyl chloride and its methyl and ethyl substitution products.

Amino derivatives of cyclic acetals derived from 1.2-glycols, or, as I may also define them, dioxalanes may be prepared from alkyl substituted 1.2-glycols by acetalization of a mixture of formaldehyde with such a 1.2-glycol, for example 1.2-propylene glycol, 2.3-butylene glycol and their homologues containing at least one methyl group in the positions identified above. When using acetaldehyde as the acetalization agent or when subsequently reacetalizing the dioxalane with a β-halogen acetaldehyde in the manner discussed above, I may also start from ethylene glycol, since then the halogen may be a substituent in the 2-methyl group and thus being in β-position to the oxygen atoms. The conversion of these dioxalanes into the halogen compounds and their transformation into amines may be effected in the same manner as in the case of the 1.3-dioxanes.

The sulfonamido compounds according to the present invention may be prepared in the conventional manner of reacting a para-substituted benzene sulfonyl halide with the amino acetals, preferably at elevated temperature, in the presence of an inert solvent and of a substance capable of neutralizing the hydrogen halide split off. The substituent in the para-position of the benzene sulfonyl halide should be either an acylamino group or any other substituent which is not affected by the reaction conditions and which may, later on, be converted into an amino group, such as an urethane, urea, nitro, azo or azomethine group.

Depending on the nature of said substituent, various methods may be used to convert it into an amino group. When starting from an acylaminobenzenesulfonamide, the free amino group will be obtained by simple hydrolysis of the acylamino group. Since this is the simplest way to prepare the new sulfonamides, I prefer this method. However, I may also start from nitro benzenesulfonamides and reduce the nitro group to the amino group, and, in an analogous manner, I may transform the other substituent set forth above into amino groups.

The compounds of the present invention have the property, found in many sulfonamido compounds, of being very active against certain bacteria, such as for example streptococci. However, the new sulfonamides are simultaneously very active in stopping the bleeding of fresh wounds so that they are very useful therapeutic agents. A more detailed description of the new compounds will be given by the following examples. The parts are by weight.

*Example 1*

A solution of 160 parts of sodium carbonate in 600 parts of water is admixed with a solution of 88 parts of 4-ω-aminomethyl-4-methyl-1.3-dioxane in 200 parts of methanol. To this mixture 156 parts of N-acetyl-sulfanilic acid chloride are added, while stirring vigorously, the temperature being kept below 25° C. The crystals formed are allowed to settle for one hour and then filtered off. The crude reaction product is recrystallized from methanol and melts at 152° C. It constitutes the 4-N-acetylamino-benzene-1-sulfonic acid amide of 4-ω-aminomethyl-4-methyl-1.3-dioxane. The yield amounts to 94 parts.

In order to prepare the free amino compounds from the acylamino compound described above the latter is boiled under reflux with an equal amount of concentrated hydrochloric acid in about 8 times its amount of methanol for one hour. After cooling, the solution is neutralized with a solution of caustic potash in methanol, the potassium chloride which has precipitated filtered off and the solution concentrated. The solid residue is recrystallized from water, if desired after purification with charcoal.

The 4-ω-aminomethyl-4-methyl-1.3-dioxane may be prepared in the following manner: 4-ω-chlormethyl-4-methyl-1.3-dioxane (prepared by condensing formaldehyde with isobutenylchloride in concentrated aqueous hydrochloric acid solution) is heated with an excess of aqueous ammonia in the presence of copper sulfate to 125° C. in a closed vessel. The aqueous reaction solution is acidified with hydrochloric acid, filtered off, and the filtrate made alcaline with caustic soda lye. The resulting amino compound is purified by distillation (B. P. 195° to 200° C.).

*Example 2*

A solution of 115 parts of amino-4-methyl-1.3-dioxane in 250 parts of methanol is slowly admixed with 233 parts of N-acetyl-sulfanilic acid chloride, while stirring and cooling. The mixture is rendered weakly alcaline by adding sodium carbonate, allowed to stand for one hour and then concentrated to about one quarter of its former volume. When cooling this solution, the 4-aminobenzenesulfonic acid amide of the amino-4-methyl-1.3-dioxane separates in the form of crystals, which melt after recrystallization from water at 137° C.

In order to prepare amino-4-methyl-1.3-dioxane I heat chloro-4-methyl-1.3-dioxane (B. P. 160° to 170° C., prepared by chlorination of 4-methyl-1.3-dioxane in the dark) with ammonia in a closed vessel to 120° C. The reaction product is acidified, filtered off, rendered alcaline, and the amino compound purified by distillation. It constitutes a mixture of 4-ω-aminomethyl-1.3-dioxane and 4-methyl-5-amino-1.3-dioxane.

*Example 3*

A solution of 206 parts of 4-methylamino-dioxalane in 400 parts of methanol is admixed with 466 parts of N-acetylsulfanilic acid chloride while stirring vigorously and keeping the temperature below 25° C. A concentrated aqueous sodium carbonate solution is then slowly added until the reaction liquid has an alcaline reaction. Crystals of 4-N-acetylaminobenzene-1-sulfonic acid amide of 4-aminomethyldioxalane are precipitated when cooling. They are recrystallized from water and then melt at 138° C. The free amino compound prepared in the manner described in Example 1 melts at 102° C.

The 4-methylaminodioxalane is prepared by heating 4 - ω - chloromethyldioxalane (prepared from 3-chloro-1.2-dihydroxypropane and formaldehyde) with aqueous ammonia in a pressure-tight vessel to 100° C. After chasing off the excess of ammonia the solution is rendered strongly alcaline and the 4-methylaminodioxalane isolated by distillation (B. P. 165° to 170° C.).

*Example 4*

A solution of 40 parts of 2-aminomethyl-4-methyl-1.3-dioxane in 50 parts of methanol is treated with 70 parts of N-acetylsulfanilic acid chloride in the manner described in Example 2. The free 4-aminobenzene-1-sulfonic acid amide of 2-aminomethyl-4-methyl-1.3-dioxane thus obtained is recrystallized from water; it melts at 103° C.

The 2-aminomethyl-4-methyl-1.3-dioxane is obtained by heating 2-bromomethyl-4-methyl-1.3-dioxane with concentrated aqueous ammonia in an autoclave to 100° C. and distillation (B. P. 83° to 87° C. under 25 millimeters pressure).

*Example 5*

A solution of 110 parts of di-(4-methyl-1.3-dioxanyl)-amine, obtained by the reaction between ammonia and the chlor-4-methyl-1.3-dioxane described in Example 2, B. P. 182° to 185° C. under 25 millimeters pressure, in 50 parts of methanol is condensed with 110 parts of N-acetylsulfanilic acid chloride in the manner described in Example 2. The oil deposited at the end of the reaction is stirred with dilute aqueous caustic soda for 1 hour, dissolved in hot ethyl acetate, and this solution boiled with charcoal for a few minutes. After filtration and cooling the free 4-aminobenzene sulfonic acid imide of the di-4-methyldioxanylamine deposits in the form of crystals (M. P. 120° C.).

What I claim is:

1. An aminobenzene sulfonamido compound of the following formula

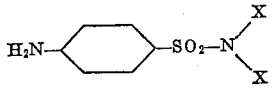

wherein at least one of the X stands for the radical of a cyclic acetal, the other being hydrogen, said acetal being the acetal of an aliphatic saturated glycol having not more than 5 carbon atoms in which the hydroxy groups are separated by from 2 to 3 carbon atoms with an aliphatic aldehyde containing up to 2 carbon atoms, and wherein the sulfonamido group shown is attached directly to a carbon atom of the cyclic acetal which is separated from the oxygen atoms of the nucleus by at least one carbon atom.

2. An aminobenzene sulfonamido compound of the following formula

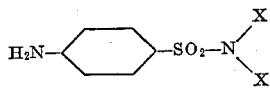

wherein at least one of the X stands for the radical of a cyclic acetal, the other being hydrogen, said acetal being the acetal of an aliphatic saturated glycol having not more than 5 carbon atoms in which the hydroxy groups are separated by from 2 to 3 carbon atoms with an aliphatic aldehyde containing up to 2 carbon atoms, and wherein the sulfonamido group shown is attached directly to a carbon atom of the cyclic acetal which is in beta position with reference to one of the oxygen atoms of the nucleus.

3. An aminobenzene sulfonamido compound of the following formula

wherein X stands for the radical of a cyclic acetal of an aliphatic saturated glycol having not more than 5 carbon atoms in which the hydroxy groups are separated by from 2 to 3 carbon atoms with an aliphatic aldehyde containing up to 2 carbon atoms, and wherein the sulfonamido group shown is attached directly to a carbon atom of the cyclic acetal which is in beta position with reference to one of the oxygen atoms of the nucleus.

4. An aminobenzene sulfonamido compound of the following formula

wherein X stands for the radical of a 1,3-dioxane having not more than 6 carbon atoms and wherein the sulfonamido group shown is attached directly to a carbon atom of the dioxane which is in beta position with reference to one of the oxygen atoms of the nucleus.

5. An aminobenzene sulfonamido compound of the following formula

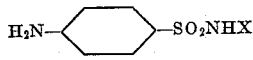

wherein X stands for the radical of 1,3-dioxane substituted by at least one and not more than 2 methyl groups, and wherein the sulfonamido group shown is attached directly to a carbon atom of the dioxane which is in beta position with reference to one of the oxygen atoms of the nucleus.

6. The 4-aminobenzene sulfonic acid amide of a primary amino-4-methyl-1,3-dioxane having not more than 6 carbon atoms and containing the amino group in beta position with reference to the oxygen atoms of the nucleus.

7. The 4-aminobenzene sulfonic acid amide of 2-aminomethyl-4-methyl-1,3-dioxane.

8. The 4-aminobenzene sulfonic acid amide of 4-aminomethyldioxalane.

WILHELM FRIEDRICHSEN.

REFERENCES CITED

The following references are of record in the file of this patent:

UNITED STATES PATENTS

| Number | Name | Date |
|---|---|---|
| 2,383,874 | Martin et al. | Aug. 28, 1945 |